US012573963B2

(12) United States Patent
Vittorio et al.

(10) Patent No.: US 12,573,963 B2
(45) Date of Patent: Mar. 10, 2026

(54) METHOD FOR CONTROLLING A FREQUENCY CONVERTER CONFIGURED TO DRIVE AN INDUCTIVE LOAD

(71) Applicant: WEG AUTOMATION EUROPE S.R.L., Gerenzano (IT)

(72) Inventors: Alessandro Vittorio, Gerenzano (IT); Manuele Gariboldi, Gerenzano (IT)

(73) Assignee: WEG AUTOMATION EUROPE S.R.L., Gerenzano (IT)

( * ) Notice: Subject to any disclaimer, the term of this patent is extended or adjusted under 35 U.S.C. 154(b) by 212 days.

(21) Appl. No.: 18/258,119

(22) PCT Filed: Dec. 17, 2021

(86) PCT No.: PCT/IB2021/061914
§ 371 (c)(1),
(2) Date: Jun. 16, 2023

(87) PCT Pub. No.: WO2022/130314
PCT Pub. Date: Jun. 23, 2022

(65) Prior Publication Data
US 2024/0039420 A1 Feb. 1, 2024

(30) Foreign Application Priority Data
Dec. 17, 2020 (EP) ..................................... 20425058

(51) Int. Cl.
*H02M 1/00* (2007.01)
*H02M 1/088* (2006.01)
(Continued)

(52) U.S. Cl.
CPC ........... *H02M 5/458* (2013.01); *H02M 1/088* (2013.01)

(58) Field of Classification Search
CPC .. H02M 7/53871; H02M 5/458; H02M 1/088; H02M 1/325; H02M 1/36; H02M 1/32
See application file for complete search history.

(56) References Cited

U.S. PATENT DOCUMENTS

2019/0267913 A1* 8/2019 Lim ...................... H02M 7/062
2020/0212824 A1* 7/2020 Kiribuchi ................ H02P 27/08
(Continued)

FOREIGN PATENT DOCUMENTS

CN      210167966 U    3/2020
DE      10159639 A1    6/2003
(Continued)

OTHER PUBLICATIONS

International Search Report and Written Opinion in PCT/IB2021/061914, mailed Feb. 18, 2022, 18 pages.

*Primary Examiner* — Sisay G Tiku
(74) *Attorney, Agent, or Firm* — ArentFox Schiff LLP; Michael Fainberg

(57) ABSTRACT

The invention relates to methods for controlling a frequency converter which supplies electric power to an inductive load. The converter comprises a power supply circuit with an input connected to a voltage source and an output connected to a power circuit by means of a first and a second conductive lines; the power supply circuit provides a direct voltage between the first and the second conductive lines to a first input of the power circuit. The power circuit comprises an inverter circuit and an intermediate circuit connected between the conductive lines to be interposed between the power supply circuit and the inverter circuit. The inverter circuit comprises three power transistors connected between the first conductive line and three output terminals, respectively, of the inverter, three additional power transistors
(Continued)

connected between the second conductive line and said three other output terminals, respectively.

16 Claims, 7 Drawing Sheets

(51) Int. Cl.
*H02M 1/32* (2007.01)
*H02M 5/458* (2006.01)
*H02M 7/538* (2007.01)

(56) References Cited

U.S. PATENT DOCUMENTS

| | | | | |
|---|---|---|---|---|
| 2020/0228043 A1* | 7/2020 | Takemura | ........... | H02M 7/5395 |
| 2022/0158569 A1* | 5/2022 | Choi | ..................... | H02M 5/458 |
| 2023/0318510 A1* | 10/2023 | Sakamoto | ............... | H02P 23/24 |
| | | | | 318/503 |
| 2025/0132688 A1* | 4/2025 | He | ...................... | H02M 7/5387 |

FOREIGN PATENT DOCUMENTS

| | | | | | |
|---|---|---|---|---|---|
| DE | 102016010740 A1 | 3/2017 | | | |
| EP | 2119587 A1 | 11/2009 | | | |
| EP | 3709499 A1 | 9/2020 | | | |
| WO | WO-2017221453 A1 * | 12/2017 | ......... | G01R 27/2611 |

* cited by examiner

METHOD FOR CONTROLLING A FREQUENCY CONVERTER CONFIGURED TO DRIVE AN INDUCTIVE LOAD

CROSS-REFERENCE TO RELATED APPLICATIONS

This application is a National Phase Application of PCT International Application No. PCT/IB2021/061914, having an International Filing Date of Dec. 17, 2021 which claims priority to European Patent Application No. 20425058.3 filed Dec. 17, 2020, each of which is hereby incorporated by reference in its entirety.

FIELD OF APPLICATION

The present invention relates, in general, to the electronic control of drives of electric circuits in alternating current for industrial applications. In particular, the invention relates to a method for controlling a frequency converter configured to drive an inductive load in alternating current, such as, for example, an ElectroMagnetic Stirrer (or EMS) used in the metallurgical sector for the production of steel.

PRIOR ART

As it is known, an ElectroMagnetic Stirrer (or EMS), or simply a stirrer, is an electrical apparatus used in the metallurgical sector, in particular, in the continuous casting steel production processes, so as to improve the homogeneity and the quality of the metal produced. Two different types of electromagnetic stirrers are known: rotary stirrers and linear stirrers. Such stirrers are configured to generate, respectively, a rotating magnetic field (rotary stirrers) or a magnetic field which translates along a predetermined direction (linear stirrers), to favor and control the movement of liquid steel flows.

A stirrer consists of coils, in particular, three-phase coils, wound on a ferromagnetic circuit. Such coils may be compared to the stator of an alternating current (AC) induction motor.

With reference to FIG. 8, the coils of a three-phase stirrer 801 used in steel production processes are powered by three-phase currents Iu, Iv, Iw generated by an AC-AC frequency converter of the known type, for example the Pulse Width Modulation frequency converter or PWM converter 800.

Such three-phase currents Iu, Iv, Iw generate an alternating magnetic field in the coils of the stirrer 801. Such magnetic field is adapted to generate respective induced electric currents which circulate inside the molten steel. Such induced currents are configured to generate a force (Lorentz force) inside the molten steel, adapted to impart a rotational torque (in the case of rotary stirrers) or translational torque (in the case of linear stirrers) to the molten metal itself.

The PWM frequency converter 800 comprises a power supply circuit 802, for example, a diode rectifier, connected in input to a voltage source $V_{AC}$ in alternating current and connected in output to a power circuit 803 (power drive) by means of a first A and a second B electrical terminals.

Such power circuit 803 comprises a three-phase inverter 804 which includes electronic power transistors Q11, Q12, Q21, Q22, Q31, Q32. Furthermore, the power circuit 803 comprises a circuit consisting of a bank of capacitors C or DC-Link 805 connected between the aforesaid first A and second B terminals. In particular, such DC-Link 805 is interposed between the output of the diode rectifier circuit 802 and a respective input of the three-phase inverter 804.

In addition, the PWM frequency converter 800 comprises an electronic control unit (not shown in FIG. 8) configured to control, by means of pulse width modulation signals, the switching on/off of the electronic power transistors Q11, Q12, Q21, Q22, Q31, Q32 of the inverter 804, to generate the aforesaid three-phase currents Iu, IV, Iw in output from the inverter 804 starting from a rectified voltage present between the first A and the second B terminals.

It should be noted that the coils of the stirrer 801 are, for the three-phase inverter 804, a load having a predominant inductive component with respect to the resistive component, for example, of the order of a few tens of mH. In consideration of this, for a correct functioning of the PWM frequency converter 800, it is advisable that a possible stop of the PWM modulation occurs by providing for a gradual reduction, in a predetermined time interval, of the current supplied to the stirrer 801. Thereby, it is possible to dissipate all the residual energy stored in the coils of the stirrer 801, avoiding the generation of unwanted overvoltages.

In fact, in the absence of suitable protections, in the case of a sudden interruption of the PWM modulation, caused by an accidental disabling of the inverter 804 or following the intervention of an alarm, the electricity stored in the stirrer 801, at the PWM modulation stopping instant, would be transferred, almost entirely, to the DC-Link capacitor bank 805, generating an overvoltage between the first A and the second B terminals.

In the specific case of PWM frequency converters for EMS applications, the energy levels accumulated in the inductive load of the stirrer may reach considerable values, both because of the high inductance values associated with the coils of the stirrer 801 and for the currents involved, which may reach values of hundreds of Amperes.

In such a scenario, a sudden stop of the PWM modulation applied to the electronic power transistors of the inverter 804, simultaneously keeping off all transistors Q11, Q12, Q21, Q22, Q31, Q32, would cause an overvoltage applied between the first A and the second B terminals of the DC-Link capacitors 805 which would easily reach values of thousands of volts, sufficient to damage such capacitors, causing a consequent machine downtime.

To overcome such a drawback, a known solution provides for the use of a dissipative unit, for example, an additional electrical resistance, operatively associated with the frequency converter 800 (internal or external to the drive). In particular, such electrical resistance unit, indicated by those skilled in the art as a braking chopper, is sized to dissipate the energy accumulated (stored) in the inductance of the stirrer by means of the Joule effect so as to prevent the overvoltage which would be applied to the capacitor bank of the DC-Link 805 in case of a sudden stop of the PWM modulation.

However, such a solution is not free from drawbacks. In fact, the dissipative unit, which includes an electrical resistor and the relative control circuit, should have a size such as to ensure the energy dissipation with peak currents of several hundred Amperes, therefore being very bulky and expensive.

A further known alternative solution provides for the use of an additional capacitor bank operatively associated with the frequency converter 800 (internal or external to the drive) to absorb a large part of the energy stored in the stirrer 801. Thereby, the overvoltage produced across the DC-Link 805, caused by a sudden stop of the PWM modulation, may be kept well below the maximum values allowed for a correct operation of the capacitors of the DC-Link 805.

However, in consideration of the energy levels which may be accumulated in the stirrer 801, the additional capacitor bank to be used should have a capacity several times greater than that of the traditional capacitors used in the DC-Link 805. Therefore, even the application of such solution would determine an increase in the cost of the PWM frequency converter 800, often unacceptable in many applications.

SUMMARY OF THE INVENTION

It is the object of the present invention to devise and provide a method for controlling a frequency converter adapted to supply electric power in alternating current, AC, to an inductive load, in particular an ElectroMagnetic Stirrer (or EMS), which allows to limit the overvoltage applied to the capacitors of the DC-Link following a stop in the PWM modulation, exceeding the limits mentioned above with reference to the known solutions.

It is a particular object of the invention to provide a control method which ensures an instant and safe, i.e., non-destructive, stop of the converter 100 following a stop of the PWM modulation.

It is another object of the invention to provide a control method which ensures the attenuation or limitation of the overvoltages generated by the stop of the PWM modulation without requiring an additional hardware unit to absorb the magnetic energy of the inductive load.

It is yet another object of the invention to provide a method for controlling a frequency converter which is substantially immune to possible faults of the power transistors of the inverter circuit and which is robust.

In a first embodiment, such object is achieved by means of a method for controlling a frequency converter which supplies electric power in alternating current, AC, to an inductive load, according to claim 1.

In a second embodiment, such object is achieved by means of a method for controlling a frequency converter which supplies electric power in alternating current, AC, to an inductive load, according to claim 3.

Preferred embodiments of such control methods are described in the dependent claims.

BRIEF DESCRIPTION OF THE DRAWINGS

Further features and advantages of the method for controlling a frequency converter according to the invention will be apparent from the following description of preferred embodiments, given by way of indicative, non-limiting examples, with reference to the accompanying Figures, in which.

In the aforesaid Figures, the same or similar elements will be indicated by means of the same reference numerals.

DETAILED DESCRIPTION

Figure 1:
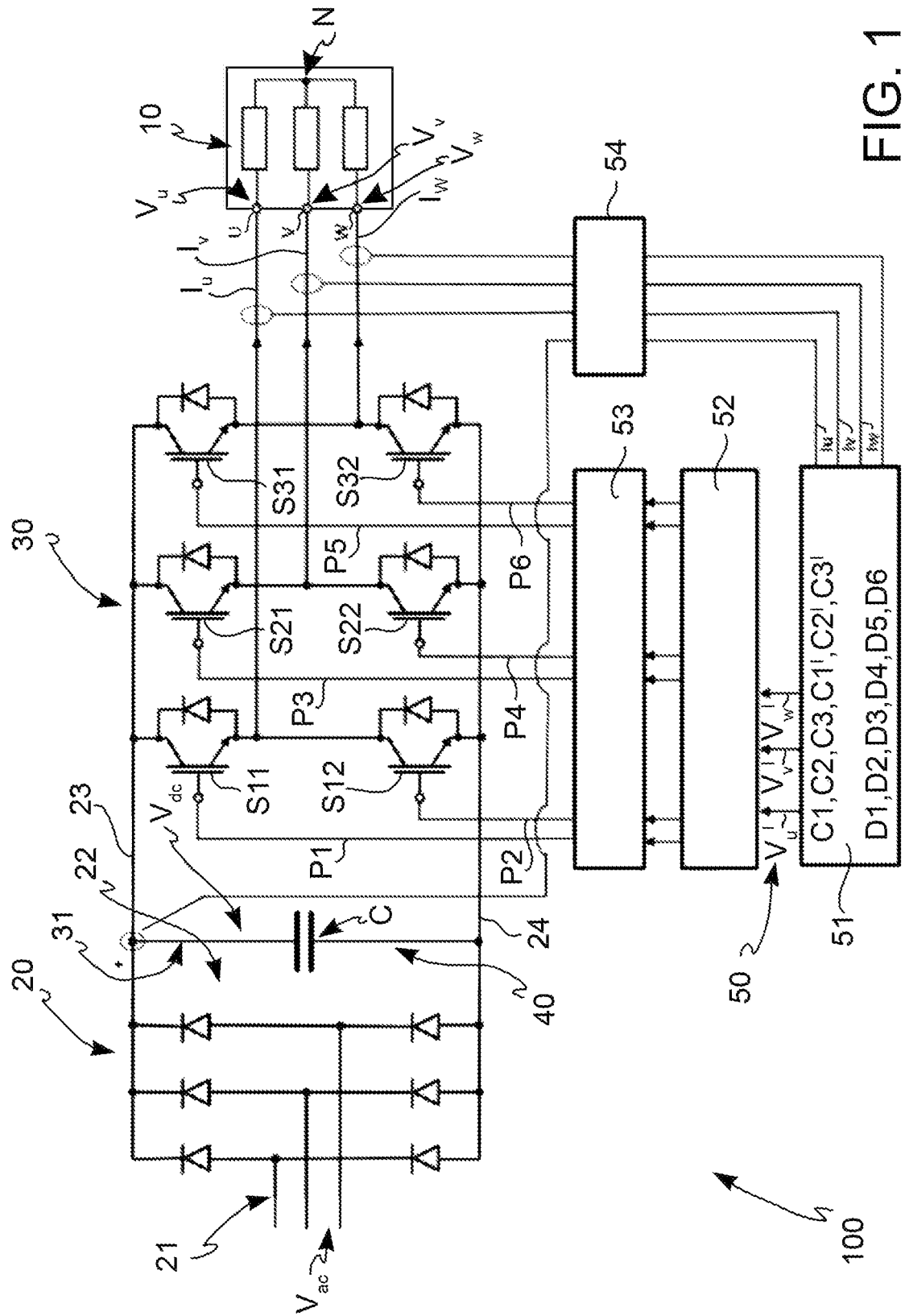
FIG. 1 shows a circuit diagram of a frequency converter, configured to drive an inductive load in alternating current, which implements the control method of the invention.

With reference to FIG. 1, a circuit diagram of a frequency converter implementing the control method of the invention, is overall indicated with reference numeral 100.

Such frequency converter 100, or simply converter, is configured to supply electrical power in alternating current, AC, to an inductive load 10. In particular, in the example of the present invention, such inductive load comprises the coils of a three-phase stirrer 10 which may be used in steel production processes.

The frequency converter 100 comprises a power supply circuit 20 having an input 21 connected to a voltage source Vac. In a particular example, such voltage source Vac is an alternating current source and takes the form, for example, of an industrial line at 480V and 50 Hz. The power supply circuit 20 has an output 22 connected to a power circuit 30, 40 through a first 23 and a second 24 conductive lines. Such power supply circuit 20 operates as a unidirectional power supply and comprises, for example, a passive diode rectifier. Such power supply circuit 20 is configured to provide a direct voltage or rectified voltage Vdc between the first 23 and the second 24 conductive lines to a first input 31 of the power circuit 30, 40.

The power circuit 30, 40 of the converter 100 comprises an inverter circuit 30 and an intermediate circuit 40 connected between the first 23 and the second 24 conductive lines to be interposed between the power supply circuit 20 and the inverter circuit 30. Such power circuit 30, 40 constitutes a DC-AC converter controlled by means of a PWM (Pulse Width Modulation) technique.

In particular, the inverter circuit or inverter 30 comprises:

a first S11, a second S21 and a third S31 power transistors connected between the first conductive line 23 and a first U, a second V and a third W output terminals, respectively, of the inverter circuit 30, a fourth S12, a fifth S22 and a sixth S32 power transistor connected between the second conductive line 24 and the aforesaid first U, second V and third W output terminals, respectively.

The power transistors of the inverter circuit 30 are, for example, static semiconductor switches (MOSFET, IGBT, GTO). As known, a diode used as an electric path for recirculating currents for inductive loads is connected, antiparallel, to each power switch.

As known, the control strategy called PWM consists in controlling the power transistors of the inverter 30 so as to "choke" the rectified voltage Vdc available in input to the inverter 30 and modulate it at the output terminals U, V, W with pulses of a suitable width, so as to regulate the amplitude and frequency of the alternating voltage, and of the relative currents, to be supplied to the inductive load 10.

It should be noted that the intermediate circuit 40 comprises a circuit consisting of a bank of capacitors C or DC-Link connected between the first 23 and the second 24 conductive lines.

Furthermore, the frequency converter 100 comprises an electronic control circuit 50 configured to generate pulse width modulation signals P1, P2, P3, P4, P5, P6 to control the switching on/off of the aforesaid first S11, second S21, third S31, fourth S12, fifth S22 and sixth S32 power transistors of the inverter 30 to convert the direct voltage Vdc in a first Vu, in a second Vv and in a third Vw three-phase voltages, applied, respectively, between the first U, the second V and the third W output terminals of the inverter circuit 30 and a reference electric potential N. In the case where the stirrer 10 is connected in a star, as in the example of FIG. 1, such reference electric potential coincides with the star center of the stirrer itself.

In addition, the switching on/off of the aforesaid first S11, second S21, third 831, fourth S12, fifth S22 and sixth 832 power transistors through the aforesaid pulse width modulation signals P1, P2, P3, P4, P5, P6 allow the inverter circuit 30 to deliver a first Iu, a second Iv and a third Iw three-phase currents to be supplied to the inductive load 10, respectively, on the first U, the second V and the third W output terminals.

In greater detail, the electronic control circuit 50 comprises a PWM modulator unit 52 achieved, for example, by means of a FPGA or PLD programmable logic. Such PWM modulator unit 52 is configured to generate the signals P1, P2, P3, P4, P5, P6 which control the switching on/off of each of the six power transistors of the inverter 30.

In an embodiment, the method of the invention is implemented on the FPGA or PLD programmable logic of the PWM modulator unit 52.

Furthermore, the electronic control circuit 50 comprises a controller unit 51, for example a microcontroller or a DSP. Such controller unit 51 is adapted to implement the current and frequency regulation algorithm and to generate phase voltage references Vu', Vv', Vw' which are transferred to the PWM modulator unit 52 as modulation indices.

In an embodiment, the control method of the invention is implemented by a firmware code incorporated in said microcontroller or DSP of the controller unit 51.

The electronic control circuit 50 further comprises a driving unit 53 comprising driving circuits of the power transistors of the inverter 30 with electric decouplers to ensure the galvanic isolation between the electronic control circuit 50 and the power circuit 30, 40.

In addition, the frequency converter 100 comprises an electronic measurement acquisition unit 54. In particular, such electronic measurement acquisition unit 54 constitutes an interface for the conditioning and the analog-digital conversion of measurement signals provided by current and voltage sensors which equip the converter 100. In particular, the converter 100 comprises three current sensors, for example Hall sensors, configured to detect instantaneous values of the first Iu, the second Iv and the third Iw three-phase currents, present, respectively, on the first U, the second V and the third W output terminals of the inverter circuit 30.

Furthermore, the converter 100 comprises a voltage sensor configured to detect instantaneous values of the voltage present between the first 23 and the second 24 conductive lines, i.e., voltage values present across the DC-Link intermediate circuit 40. Such analogue voltage values are sent to the electronic measurement acquisition unit 54 to be converted into respective digital values, to be provided to the controller unit 51. The detected voltage values are used by the controller unit 51 to regulate and protect the converter 100.

In particular, the current regulator, digitally implemented in the controller unit 51 is configured to compare the current triad Iu, Iv and Iw measured in output with a reference triad (desired values). On the basis of the current error, i.e., of the difference between the desired value and the measured value, the regulator calculates the voltage references Vu', Vv', Vw' to be applied to each step of the load 10. The generation (application to the load terminals) of the voltage triad required by the current regulator is achieved by the PWM modulator 52 by means of the known voltage choking technique available on the DC-link circuit 40.

Before being transferred to the PWM modulator 52, the voltage references Vu', Vv', Vw' produced by the current regulator, in particular by the controller unit 51, are converted into modulation indices (fractionation) on the basis of the instantaneous value of the voltage present on the DC-link circuit 40.

Figure 2:
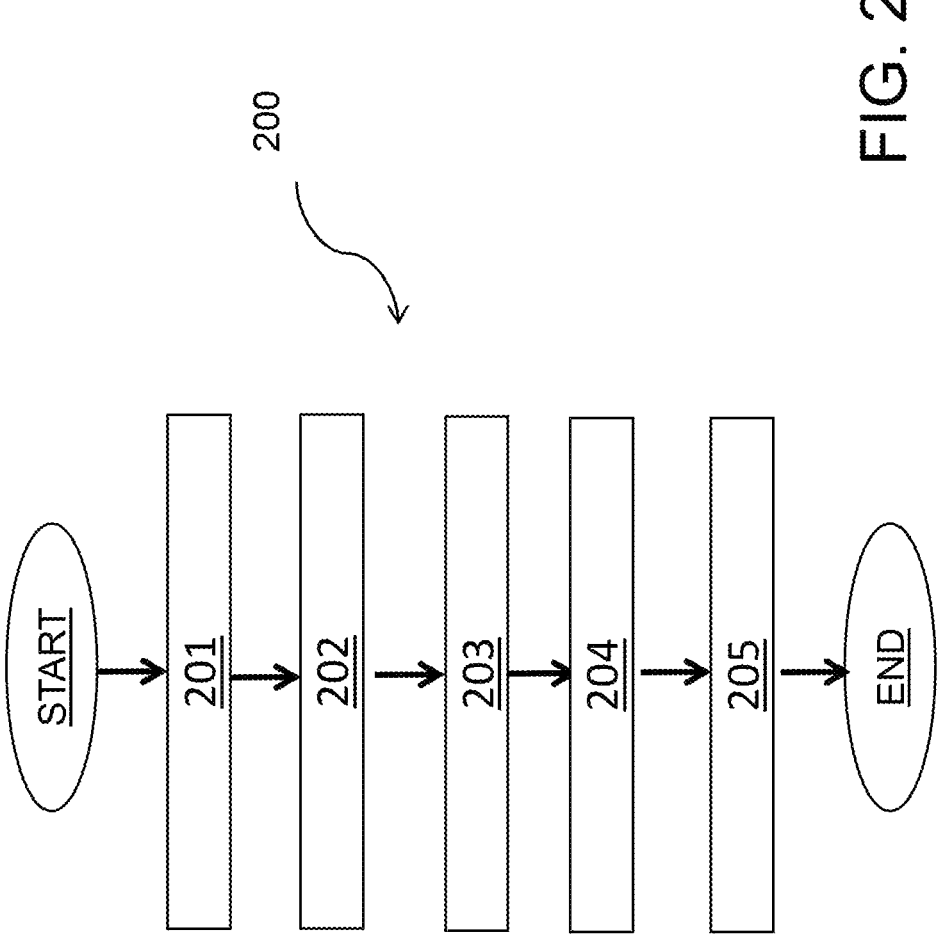
FIG. 2 shows, with a flow diagram, a first embodiment of the method for controlling the frequency converter of FIG. 1 following a stop of the PWM modulation.
Figure 3:
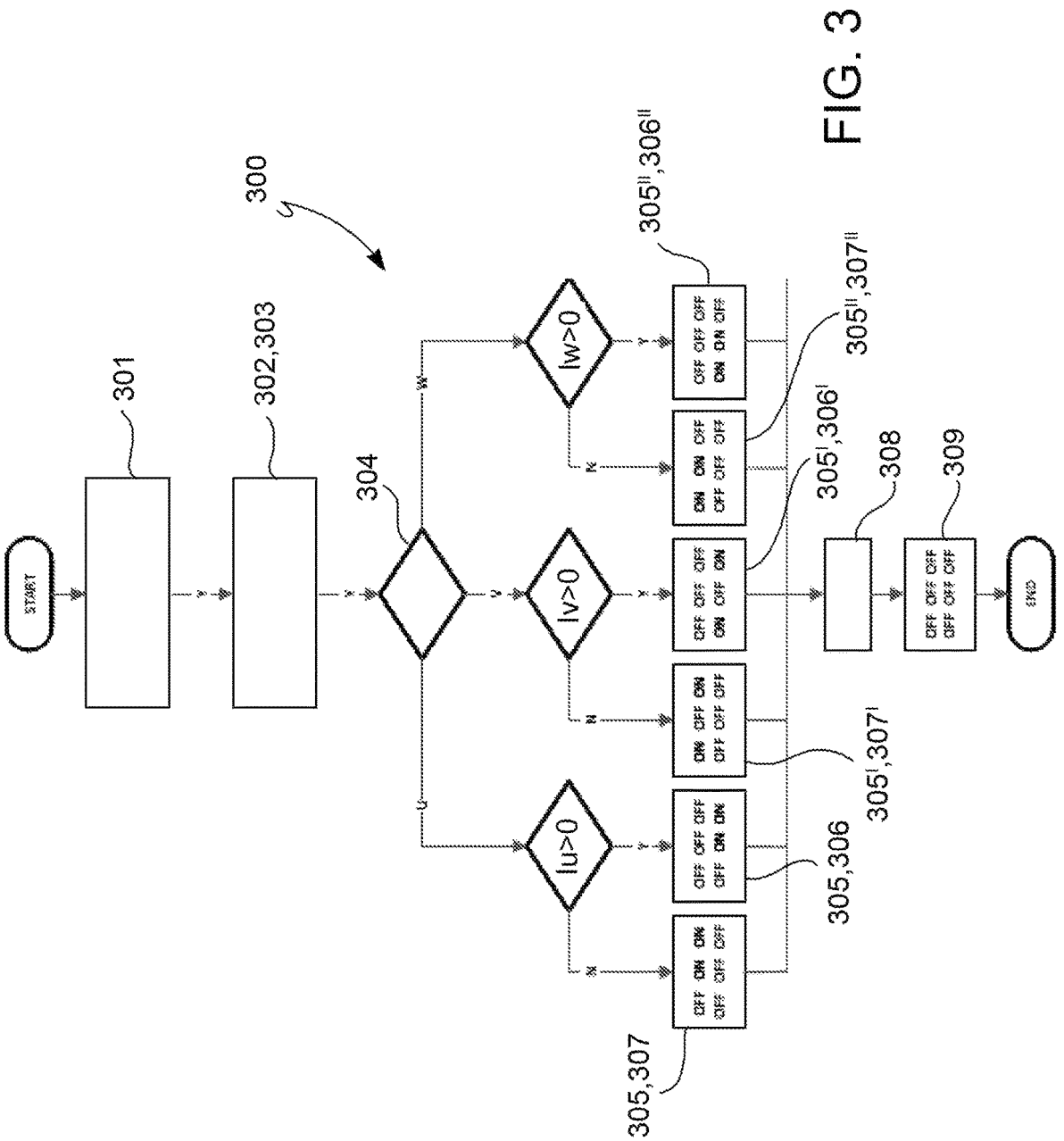
FIG. 3 shows, with a flow diagram, a second embodiment of the method for controlling the frequency converter of FIG. 1 following a stop of the PWM modulation.

With reference to FIGS. 2 and 3, the operating steps of a first 200 and of a second 300 embodiments of the control method of the invention, implemented by the frequency converter 100, are described in greater detail below.

In particular, the electronic control circuit 50 of the converter 100 is arranged to execute the codes of an application program which implements such method 200, 300 to control the frequency converter 100 which supplies electric power in alternating current to an inductive load 10, in particular the coils of a stirrer.

In order to prevent an excessive overvoltage on the DC-Link intermediate circuit 40 of the converter 100, the method 200, 300 of the invention involves short-circuiting the inductive load 10 after stopping the PWM modulation by means of an adequate control of the inverter 30 of the power circuit.

Thus, the energy accumulated in the coils of the stirrer 10 is dissipated by means of the Joule effect on the parasitic resistive elements present, for example, on the stirrer itself, on the connection cables between the inverter 30 and the load 10 and on the semiconductor power transistors of the inverter 30.

In the following description, it will be assumed that the power transistors of the DC-AC converter at impressed voltage 30, 40 are comparable to ideal switches, capable of switching from a switched off or cut-off state (OFF) to a switched on or conduction state (ON), and vice versa, in zero time.

With reference to FIG. 2, in a first embodiment, such control method 200 comprises a step of generating 201, by the electronic control circuit 50, the pulse width modulation signals P1, P2, P3, P4, P5, P6 to control the switching on/off of said first S11, second S21, third S31, fourth S12, fifth S22 and sixth S32 power transistors of the inverter 30. Thereby, the rectified voltage Vdc is converted into the three-phase voltages Vu, Vv, Vw and in the first Iu, in the second Iv and in the third Iw three-phase currents to be supplied to the inductive load 10, respectively, on the first U, the second V and the third W output terminals of the inverter circuit 30.

The method 200 further comprises a step of detecting 202 an interruption in the generation of the aforesaid pulse width modulation signals P1, P2, P3, P4, P5, P6 on the basis of which the first S11, second S21, third S31, fourth S12, fifth S22 and sixth S32 power transistors are simultaneously off.

Following such detection, the method 200 comprises a step of controlling 203, 204, 205, by the electronic control circuit 50, the simultaneous switching on of the first S11, the second S21 and the third S31 electronic power transistors or the simultaneous switching on of the fourth S12, the fifth S22 and the sixth S32 electronic power transistors.

Thereby, the slip of the first Iu, second Iv and third Iw three-phase currents towards the intermediate circuit 40, i.e., towards the capacitors C of the DC-Link, is inhibited. The method 200 therefore ensures an instant and safe, i.e. non-destructive, stop of the converter 100.

In a preferred embodiment of the control method 200, the aforesaid step of controlling 203, 204, 205 occurs at a first instant of time t1 and comprises the further steps of:

keeping on 204 the first S11, the second S21 and the third S31 electronic power transistors, or keeping on the fourth S12, the fifth S22 and the sixth S32 electronic power transistors, during a time interval T1 delimited by the first instant t1 of time and by a subsequent second instant t2 of time;

in such second instant of time t2, it is provided to simultaneously switch off 205 the first S11, the second S21 and the third S31 electronic power transistors which were on during the time interval T1 or to simultaneously switch off 205 the fourth S12, the fifth S22 and the sixth S32 electronic power transistors which were on during the time interval T1.

Therefore, the control method 200 ensures that the energy accumulated in the coils of the stirrer 10 is dissipated on the parasitic resistive elements present on the stirrer itself, on the connection cables between the inverter 30 and the load and on the semiconductor transistors of the inverter bridge during the time interval T1, without requiring an additional hardware unit to absorb the magnetic energy accumulated in the inductive load 10. Such time interval T1 is proportional to the electromagnetic time constant of the ohmic-inductive load 10.

With reference to FIG. 3, in a second embodiment, such control method 300 of the invention comprises a step of generating 301, by the electronic control circuit 50 of the frequency converter 100, the pulse width modulation signals P1, P2, P3, P4, P5, P6 to control the switching on/off of the first S11, second S21, third S31, fourth S12, fifth S22 and sixth S32 power transistors of the inverter 30. Thereby, the rectified voltage Vdc is converted into the three-phase voltages Vu, Vv, Vw and in the first Iu, in the second Iv and in the third Iw three-phase currents to be supplied to the inductive load 10, respectively, on the first U, the second V and the third W output terminals of the inverter circuit 30.

Furthermore, the method 300 comprises a step of detecting 302, at an instant of time of interruption t0, an interruption in the generation of the pulse width modulation signals P1, P2, P3, P4, P5, P6 on the basis of which the first S11, second S21, third S31, fourth S12, fifth S22 and sixth S32 power transistors are simultaneously off.

Furthermore, the method 300 comprises a step of detecting 303, by the electronic control circuit 50, an instantaneous value of the first Iu, second Iv and third Iw three-phase currents at such instant of time of interruption t0.

Furthermore, a step is provided of detecting 304, in such instant of time of interruption t0, by the electronic control circuit 50, operating status signals F1, F2, F3, respectively: of the first S11 and of the fourth S12 power transistors, of the second S21 and of the fifth S22 power transistors, of the third S31 and of the sixth S32 power transistors.

In the case where at least one of such first S11 and fourth S12 power transistors is in a fault condition, the method 300 provides the steps of:

keeping off 305, by the electronic control circuit 50, such first S11 and fourth S12 power transistors;

controlling 306, by the electronic control circuit 50, the simultaneous switching on of the fifth S22 and of the sixth S32 electronic power transistors, if the instantaneous value of the first Iu phase current is greater than zero, controlling 307 the simultaneous switching on of the second S21 and of the third S31 electronic power transistors, if the instantaneous value of the first Iu phase current is less than zero.

The operating status signals F1, F2, F3 are, for example, associated with the driving unit 53.

Alternatively, in the case where at least one of such second S21 and fifth S22 power transistors is in a fault condition, the method 300 provides the steps of:

keeping off 305', by the electronic control circuit 50, the second S21 and the fifth S22 power transistors;

controlling 306', by the electronic control circuit 50, the simultaneous switching on of the fourth S12 and of the sixth S32 electronic power transistors, if the instantaneous value of the second Iv phase current is greater than zero, controlling 307', by the electronic control circuit 50, the simultaneous switching on of the first S11 and of the third S31 electronic power transistors, if the instantaneous value of said second Iv phase current is less than zero.

Alternatively, in the case where at least one of said third S31 and sixth S32 power transistors is in a fault condition, the method 300 provides the steps of:

keeping off 305", by the electronic control circuit 50, said third S31 and sixth S32 power transistors in the fault condition;

controlling 306", by the electronic control circuit 50, the simultaneous switching on of the fourth S12 and of the fifth S22 electronic power transistor, if the instantaneous value of the third Iw phase current is greater than zero, controlling 307", by the electronic control circuit 50, the simultaneous switching on of the first S11 and of the second S21 electronic power transistors, if the instantaneous value of the third Iw phase current is less than zero.

Therefore, the control method 300 provides, of the three branches of the inverter 30, the switching on of a single pair of switches present on the two operating branches. The branch of the inverter 30 which includes the defective transistors is isolated and left inactive. The selection of the pair of switches to be brought into the conduction state depends:

on the instantaneous value of the current circulating in the branch of the inverter 30 involved in the fault at the instant of the stop t0 of the PWM modulation; and on the operating status of each of the six power transistors. Such information is essential since the ignition of the wrong pair of transistors would produce an overvoltage on the capacitors C of the intermediate circuit 40 of the DC-Link, which the present invention aims at avoiding.

By applying the method 300, in any one of the aforesaid alternatives, the slip of the first Iu, second Iv and third Iw three-phase currents towards the intermediate circuit 40, i.e., towards the capacitors of the DC-Link, is inhibited. The method 300 therefore ensures an instant and safe, i.e., non-destructive, stop of the converter 100.

In a preferred embodiment of the control method 300, the aforesaid step of controlling 306, 307, 306', 307', 306", 307" occurs at a first instant of time t1 and comprises the further steps of:

keeping on 308, during a time interval T1 delimited by said first instant t1 of time and by a subsequent second instant t2 of time:

the fifth S22 and the sixth S32 electronic power transistor, if the instantaneous value of the first Iu phase current is greater than zero, the second S21 and the third S31 electronic power transistor, if the instantaneous value of the first Iu phase current is less than zero;

or the fourth S12 and the sixth S32 electronic power transistor, if the instantaneous value of the second Iv phase current is greater than zero, the first S11 and the third S31 electronic power transistors, if the instantaneous value of the second Iv phase current is less than zero;

or the fourth S12 and the fifth S22 electronic power transistor, if the instantaneous value of the third Iw phase current is greater than zero, the first S11 and the second S21 electronic power transistors, if the instantaneous value of the third Iw phase current is less than zero.

The method 300 further involves, in such second instant of time t2, the step of simultaneously switching off 309 the fifth S22 and the sixth S32 electronic power transistor, or the second S21 and the third S31 electronic power transistor;

or the fourth S12 and the sixth S32 electronic power transistor, or the first S11 and the third S31 electronic power transistors;

or the fourth S12 and the fifth S22 electronic power transistor, or the first S11 and the second S21 electronic power transistors.

Advantageously, also the method 300 ensures that the energy accumulated in the coils of the stirrer 10 is dissipated on the parasitic resistive elements present on the stirrer itself, on the connection cables between the inverter 30 and the load 10 and on the semiconductors of the inverter 30 during the time interval T1, without requiring an additional hardware unit to absorb the magnetic energy of the inductive load 10.

It should be noted that the duration of said time interval T1 described with reference to the method 200, 300 for controlling a frequency converter 100 of the present invention is programmable.

In particular, the duration of such time interval T1 is greater than or equal to 3.5*(L/R), L being the inductance of the coils of the stirrer 10 and R being the resistance associated with such coils. This is the discharge time of the currents. In the case of L=20 mH and R=100 mOhm, such time interval T1 is greater than or equal to 0.7 seconds.

A different embodiment of the method 200, 300 of the invention is based on the monitoring of the aforementioned first Iu, second Iv and third Iw three-phase currents. A measurement of the aforesaid currents is implemented in the control scheme of the converter 100 described with reference to FIG. 1.

In such embodiment, the triad of power transistors (in case of the method 200) or the pair of power transistors (in case of the method 300) remain on until all three phase currents Iu, Iv and Iw become equal to zero.

Therefore, in general terms, the application of the ignition controls according to the methodologies described in the present invention, i.e., the duration of the ignition time interval T1, may be determined by the current discharge time interval, as mentioned above, or it may be delimited by the reception of a signal representative of the condition Iu=Iv=Iw=0.

With reference to the method 200 for controlling a frequency converter 100 of FIG. 2, such step of controlling 203, 204, 205 further comprises a step of generating, by the electronic control circuit 50, first control signals C1, C2, C3, C1', C2', C3' to simultaneously switch on the first S11, the second S21 and the third S31 electronic power transistors or to simultaneously switch on the fourth S12, the fifth S22 and the sixth S32 electronic power transistors.

With reference to the method 300 for controlling a frequency converter 100 of FIG. 3, such step of controlling 306, 307, 306', 307', 306", 307" comprises a step of generating, by the electronic control circuit 50:

first control signals D5, D6, i.e., a pair of signals, to simultaneously switch on the fifth S22 and the sixth S32 electronic power transistors, if the instantaneous value of the first Iu phase current is greater than zero, second control signals D2, D3 to simultaneously switch on the second S21 and the third S31 electronic power transistor, if the instantaneous value of said first Iu phase current is less than zero; Alternatively, a step is provided of generating:

third control signals D4, D6 to simultaneously switch on the fourth S12 and the sixth S32 electronic power transistors, if the instantaneous value of said second Iv phase current is greater than zero, fourth control signals D1, D3 to simultaneously switch on the first S11 and the third S31 electronic power transistors, if the instantaneous value of said second Iv phase current is less than zero. Alternatively, a step is provided of generating:

fifth control signals D4, D5 to simultaneously switch on the fourth S12 and the fifth S22 electronic power transistor, if the instantaneous value of said third Iw phase current is greater than zero, sixth control signals D1, D2 to simultaneously switch on the first S11 and the second S21 electronic power transistors, if the instantaneous value of said third Iw phase current is less than zero.

The operation of the frequency converter 100 and the effectiveness of the methods 200, 300 of the invention were analyzed with a circuit simulation model and then experimentally tested, using a stirrer coil as the inductive load 10 in the following operating conditions:

output current: 600 Arms;

power supply voltage Vac: 480V;

inductance of the stirrer coil: 40 mH;

filter capacitor C of the DC-link: 25 mF.

Figures 8, 9A, 9B:
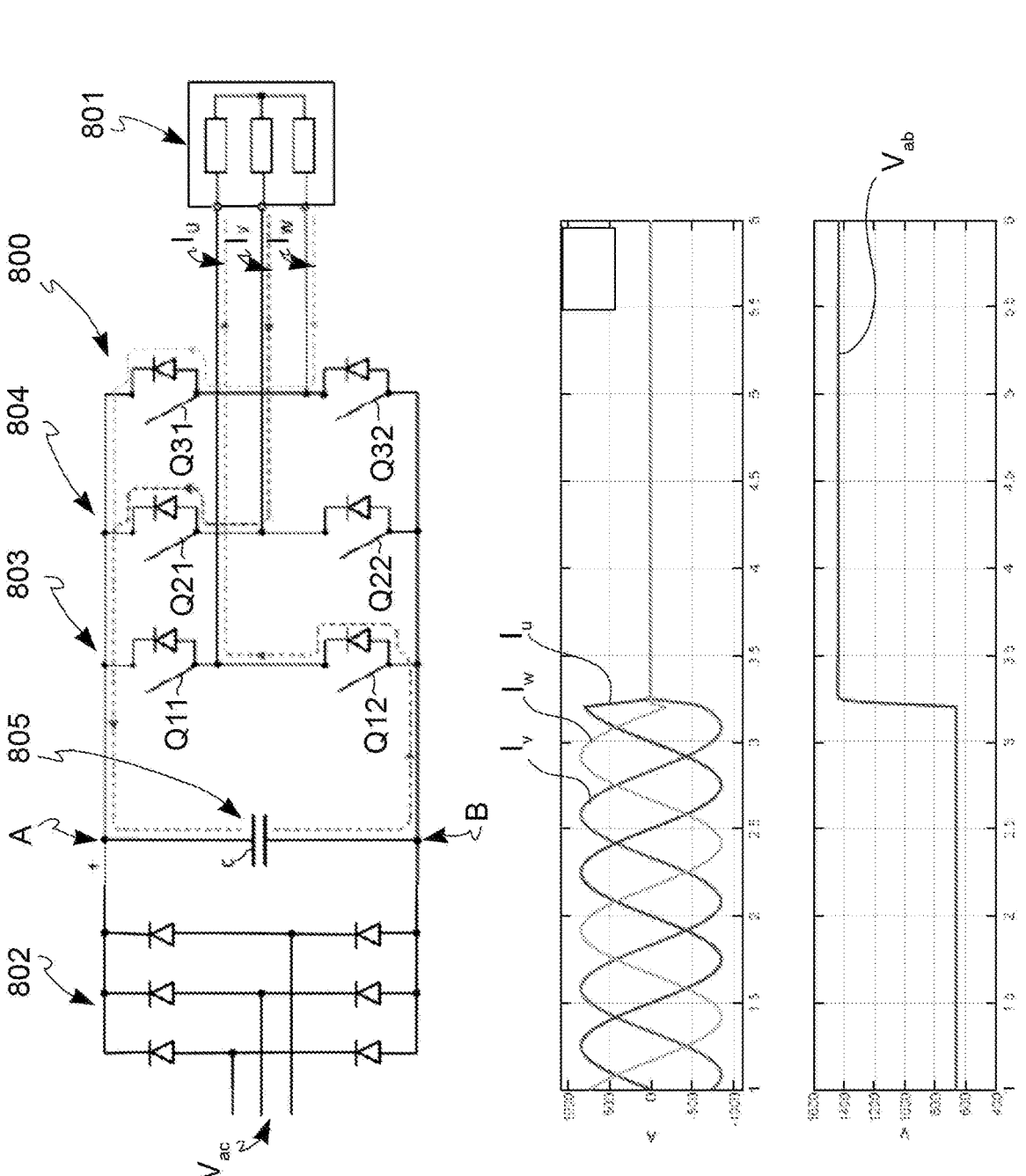
FIG. 8 shows a circuit diagram of a portion of a frequency converter of the known type adapted to drive an inductive load and the paths of the three-phase currents supplied on such load, following a stop of the PWM modulation and in the absence of the control method of the invention.
FIGS. 9A-9B show, as a function of time, respectively, trends of the three-phase currents supplied on the inductive load by the frequency converter of FIG. 8 and a trend of the voltage applied to the DC-Link capacitors following a stop of the PWM modulation and in the absence of the control method of the invention.

FIGS. 9A and 9B respectively show the waveforms of the three phase currents Iu, Iv, Iw in output from the converter 800 and the trend of the rectified voltage Vab of the DC-link intermediate circuit before and after a forced interruption of the generation of the PWM control signals of the power transistors Q11, Q21, Q31, Q12, Q22, Q32, in the case where the methods 200, 300 of the invention are not applied.

The generation of the PWM control signals is suspended at the instant t=3.2 s. Each of the six power transistors remains in the cut-off state (OFF state). Under these conditions, the energy accumulated in the inductive load 801 is transferred on the capacitor C of the DC-link circuit 805 by means of the recirculation diodes connected antiparallel to each of the six power transistors Q11, Q21, Q31, Q12, Q22, Q32. The path of the discharge currents of the coils of the stirrer 801 in the simulated test for t≥3.2 s is shown in FIG. 8.

As shown in FIG. 9B, in such case, the voltage Vab between the terminals A and B of the DC-link 805 increases until reaching excessively high values, even greater than 1400V. The rise of the voltage to such levels may damage the capacitor C of the DC-Link and, consequently, cause a machine downtime.

Figures 4A, 4B, 5:
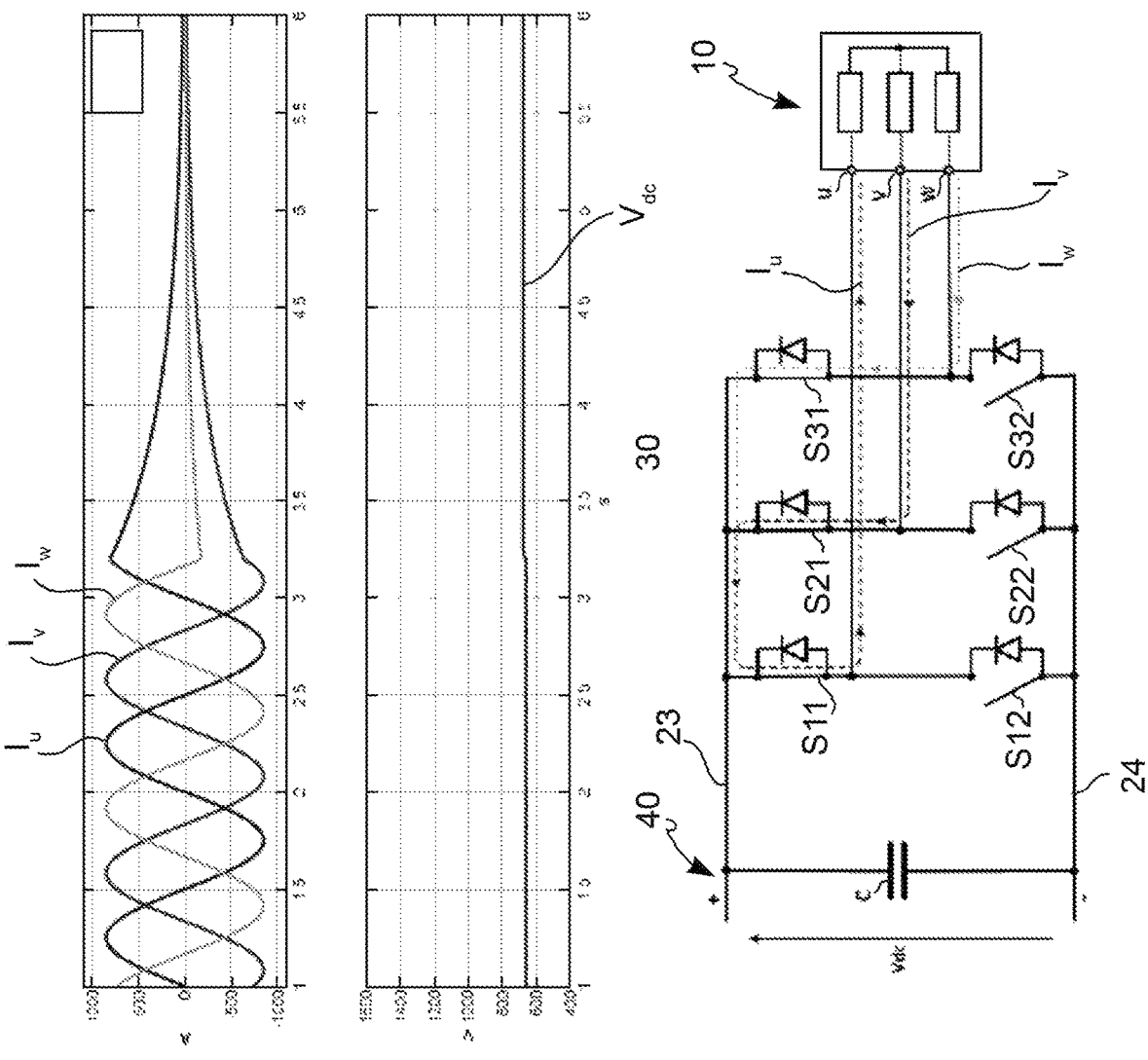
FIGS. 4A-4B show, as a function of time, respectively, trends of the three-phase currents supplied on the inductive load by the frequency converter of FIG. 1 and a trend of the voltage applied to the DC-Link capacitors following the application of the first embodiment of the control method of the invention.
FIG. 5 diagrammatically shows a portion of the circuit diagram of the frequency converter of FIG. 1 and the paths of the three-phase currents of FIG. 4A.

FIGS. 4A and 4B respectively show the waveforms of the three phase currents Iu, Iv, Iw in output from the converter 100 and the trend of the rectified voltage Vdc of the DC-link intermediate circuit 40 before and after a forced interruption of the generation of the PWM control signals of the power transistors S11, S21, S31, S12, S22, S32, in the case where the method 200 of the invention is applied.

Subsequently, at the instant t=3.2 s, the method 200 intervenes by controlling the closing of the upper power transistors of each of the three branches of the inverter 30. From the circuit point of view, the application of the method 200 produces a short-circuit of the output terminals U-V-W of the three-phase load 10. The rectified voltage Vdc of the DC-link 40 remains stable and substantially equal to the rectified value of the mains voltage, as it may be seen in FIG. 4B.

FIG. 5 shows how the discharge currents of the coils of the stirrer 10 circulate. The accumulated magnetic energy is thus dissipated internally by means of the Joule effect. In order to discharge most of the magnetic energy stored in the stirrer 10, the power transistors S11, S21, S31 (alternatively S12, S22, S32) remain in conduction (ON state) at least for the aforementioned time interval T1 equal to three and a half times the electromagnetic time constant L/R, L and R respectively being the value of the magnetic inductance and of the electric resistance of the single coil of the three-phase stirrer 10. At the end of this time interval T1, the power transistors S11, S21, S31 (alternatively S12, S22, S32) are switched off (OFF state).

Such control method 200 does not require the measurement of the phase currents and of the voltage present across the DC-Link 40. The protection function performed by the control method 200 intervenes after each stop of the PWM modulation, forcing the simultaneous closure of the three upper or lower power transistors of the inverter 30 for a time interval T1 proportional to the electromagnetic time constant of the ohmic-inductive load 10. Such method 200 is therefore simple to implement.

It should be noted that the frequency converter 100 may have operating anomalies caused by defects in the driving unit 53 or by a desaturation condition of one of the power transistors of the inverter 30. Such anomalies could make one of the branches of the inverter 30 of the converter unusable. In such a condition, the method 200 described above would be inapplicable.

On the contrary, the control method 300 of the invention, in accordance with the algorithm shown in FIG. 3, allows the operation of the inverter 30 to be stopped, in any case, safely, even in the presence of such anomalies, by controlling only the two branches of the power circuit still functioning.

In other words, the control method 300 is a variant of the invention which is more robust with respect to the method 200. As mentioned above, such method 300 requires the detection of the instantaneous information of the direction of the phase currents Iu, Iv, Iw and a diagnostic of the operating status of the individual power devices capable of detecting any anomalies.

Figures 6A, 6B, 7:
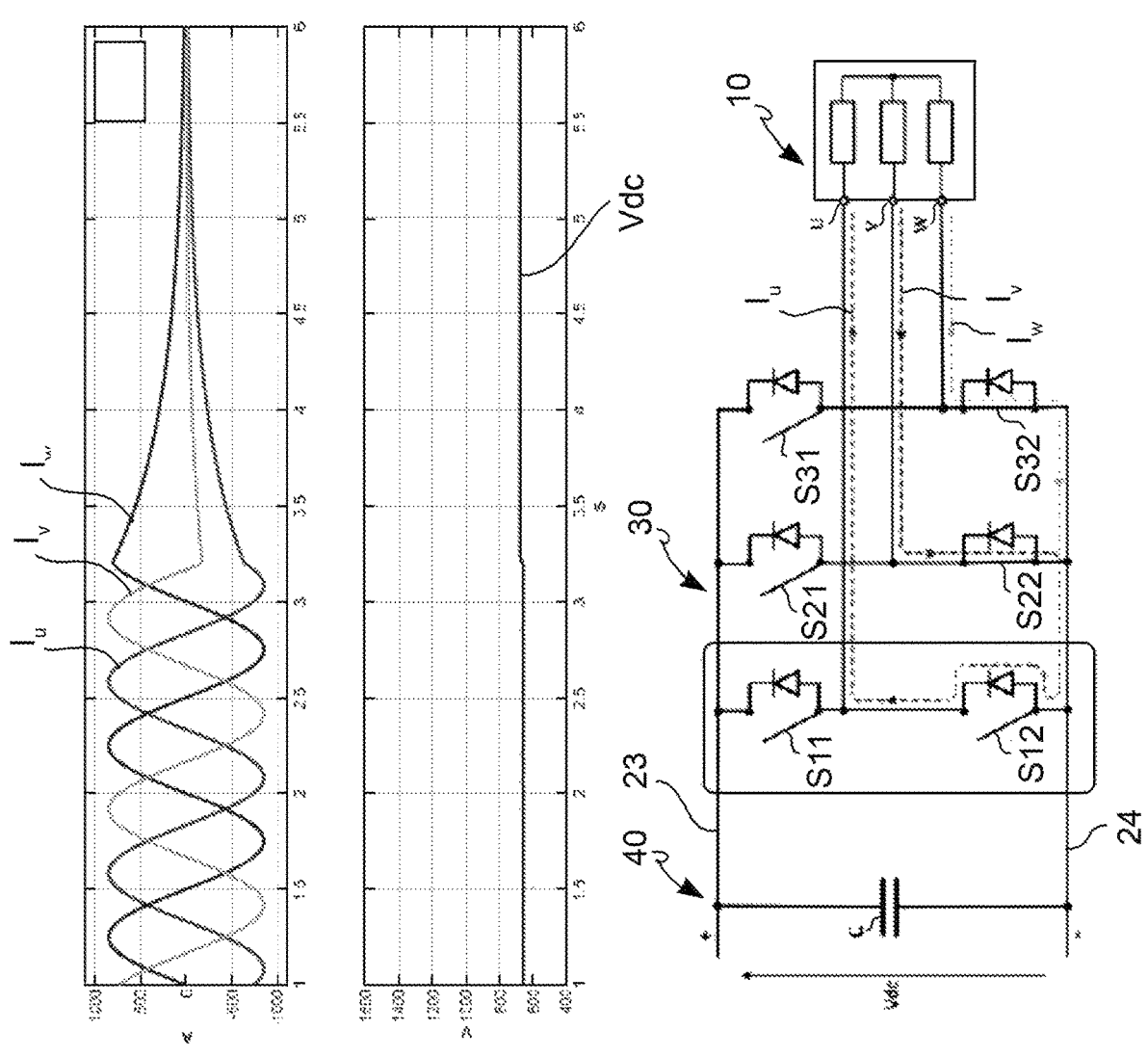
FIGS. 6A-6B show, as a function of time, respectively, trends of the three-phase currents supplied on the inductive load by the frequency converter of FIG. 1 and a trend of the voltage applied to the DC-Link capacitors following the application of the second embodiment of the control method of the invention.
FIG. 7 diagrammatically shows a portion of the circuit diagram of the frequency converter of FIG. 1 and the paths of the three-phase currents of FIG. 6A.

FIGS. 6A and 6B respectively show the waveforms of the three phase currents Iu, Iv, Iw in output from the converter 100 and the trend of the rectified voltage Vdc of the DC-link intermediate circuit 40 before and after a forced interruption of the generation of the PWM control signals of the power transistors S11, S21, S31, S12, S22, S32, in the case where the method 300 of the invention is applied.

FIG. 7 shows a portion of the converter 100 in case of application of the control method 300, having assumed a fault in the branch of the inverter 30 which comprises the power transistors S11 and S12. On the basis of the direction of the first phase current Iu corresponding to the isolated branch, the control method 300 controls the simultaneous switching on (ON state) of the power transistors of the other two branches, in particular, of the transistors S22 and S32.

The same result would be obtained assuming a fault on the second branch of the inverter 30, for which the method 300 controls, for example, the simultaneous switching on of the power transistors S11 and 331 once having detected that the second phase Iv current is less than zero.

Furthermore, during the step of starting and stopping the frequency converter 100 for a normal work cycle, the current delivered on the inductive load 10 is generally regulated on the basis of a linear ramp.

The Applicant has verified that short stop ramps, i.e., involving a rapid variation of the current from a nominal value to zero, may generate an increase in the voltage Vdc of the DC-Link 40 beyond a threshold value which would trigger the intervention of an overvoltage protection.

The protection commonly adopted in power converters to prevent excessive overvoltages of the DC-link input circuit 40 during the operation of the inverter is entrusted to a comparator (implemented via hardware or software) which constantly compares the measurement of the voltage present on the DC-link circuit 40 with a limit threshold value (suitably calibrated or programmed). If the value of the voltage of the DC-link is greater than the set limit, the comparator instantly inhibits the PWM modulation by forcing all the power transistors to switch off.

However, in applications involving the use of inductive loads, such arrangement would not ensure a reliable protection in all operating conditions. In fact, switching off all the power transistors does not produce an effective electrical disconnection from the load.

In other words, such intervention, in the absence of the application of one of the methods 200, 300 of the invention, may damage the power circuit 30, 40 of the converter 100, since the magnetic energy stored in the coils of the stirrer 10 would be transferred to the capacitor C of the DC-link intermediate circuit 40, by means of the recirculation diodes present in the power devices, with a consequent increase in the voltage between the first 23 and the second 24 conductive lines.

Such drawback is effectively avoided by using the control methods 200, 300 of the invention. In particular, FIGS. 10A-10B show, as a function of time, respectively, trends of the three-phase currents Iu, Iv, Iw supplied on the inductive load 10 by the frequency converter of FIG. 1 and a trend of the voltage Vdc applied to the DC-Link capacitors, during a step of stopping a work cycle and following the application of one of the control methods of the invention.

Figures 10A, 10B:
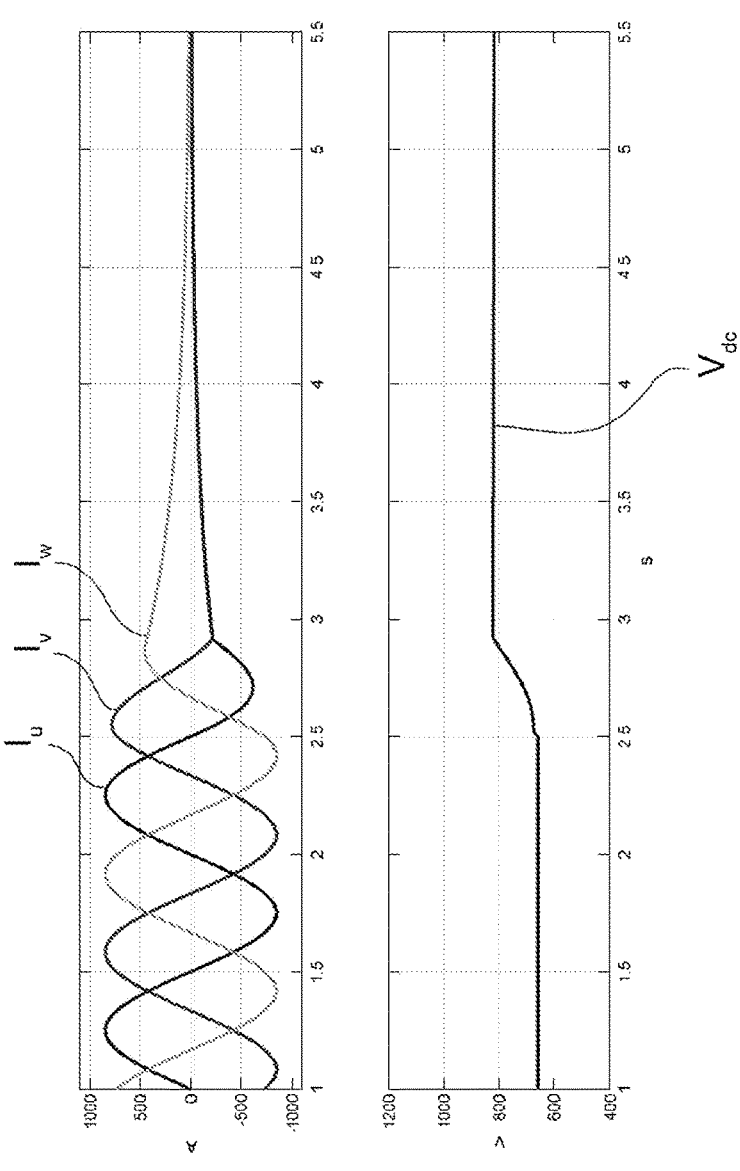
FIGS. 10A-10B show, as a function of time, respectively, trends of the three-phase currents supplied on the inductive load by the frequency converter of FIG. 1 and a trend of the voltage applied to the DC-Link capacitors, during a step of stopping a work cycle and following the application of the control method of the invention.

In particular, the intervention of such controls, following the stop of the PWM modulation due to overvoltage, limits the voltage Vdc of the DC-link to a threshold value, for example, equal to about 820V, as shown in FIG. 10B, below the maximum value tolerable by the DC-Link circuit.

It should be noted that the threshold value is generally set below the maximum limit tolerated by the filter capacitors, thus applying a safety margin.

The method 200, 300 for controlling a frequency converter 100 according to the invention, as already mentioned above, has numerous advantages and achieves the intended objects.

In fact, such method 200, 300 exploits only parts of the inverter 30, therefore, it does not require further additional elements, expensive and bulky, which would be necessary to avoid breaking the converter 100. In particular, with respect to the known converters, such method 200, 300 does not require using either a dissipative unit or an additional capacitor bank to dissipate the overvoltages generated on the DC-Link 40 following a sudden stop of the PWM modulation applied to the electronic power transistors of the inverter 30.

In other words, with the same protection functions ensured, the frequency converter 100 which implements the method 200, 300 would be less bulky and/or less expensive with respect to the known converters currently used.

To the embodiments of the control method described above, a person skilled in the art may, in order to meet contingent needs, make modifications, adaptations and substitutions of elements with other functionally equivalent ones without departing from the scope of the following claims. All the features described above as belonging to one possible embodiment may be implemented independently from the other embodiments described.

What is claimed is:

1. A method for controlling a frequency converter adapted to supply electric power in alternating current, AC, to an inductive load, the frequency converter comprises:
   a power supply circuit having an input connected to a voltage source and an output connected to a power circuit by means of a first and a second conductive lines, the power supply circuit providing a direct voltage between the first and the second conductive lines to a first input of the power circuit;
   the power circuit comprises an inverter circuit and an intermediate circuit connected between the first and the second conductive lines to be interposed between the power supply circuit and the inverter circuit;
   the inverter circuit comprises:
      a first, a second and a third power transistors connected between the first conductive line and a first, a second and a third output terminals, respectively, of the inverter circuit,
      a fourth, a fifth and a sixth power transistors connected between the second conductive line and the first, second and third output terminals, respectively, the control method comprising the steps of:
   generating, by an electronic control circuit of the frequency converter, pulse width modulation signals to control the switching on/off of the first, second, third, fourth, fifth and sixth power transistors of the inverter to convert the direct voltage in a first, in a second and in a third three-phase voltages, applied, respectively, between the first, second and third output terminals of the inverter circuit and a reference electric potential, and to deliver a first, a second and a third three-phase currents to the inductive load;
   detecting an interruption in the generation of the pulse width modulation signals on the basis of which the first, second, third, fourth, fifth and sixth power transistors are simultaneously off;
   controlling, by the electronic control circuit, the simultaneous switching on of the first, the second and the third electronic power transistors or the simultaneous switching on of the fourth, the fifth and the sixth electronic power transistors to inhibit a slip of the first, second and third three-phase currents towards the intermediate circuit, wherein the step of controlling occurs at a first instant of time and comprises the further steps of:
      keeping on the first, the second and the third electronic power transistors, or keeping on the fourth, the fifth and the sixth electronic power transistors, during a time interval delimited by the first instant of time and by a subsequent second instant of time;
      in the second instant of time, simultaneously switching off the first, the second and the third electronic power transistors which were on during the time interval or simultaneously switching off the fourth, the fifth and the sixth electronic power transistors which were on during the time interval.

2. The method for controlling the frequency converter according to claim 1, wherein a duration of the time interval is programmable.

3. The method for controlling the frequency converter according to claim 1, wherein a duration of the time interval is greater than or equal to 3.5*(L/R), L is an inductance associated with the inductive load and R is a resistance associated with such load.

4. The method for controlling the frequency converter according to claim 1, wherein the step of controlling comprises a step of generating, by the electronic control circuit, first control signals to simultaneously switch on the first, the second and the third electronic power transistors or to simultaneously switch on the fourth, the fifth and the sixth electronic power transistors.

5. A frequency converter configured to supply electric power in alternating current, AC, to an inductive load, the converter comprising:
   the power supply circuit having an input connected to a voltage source and an output connected to a power circuit by means of the first and a second conductive lines, the power supply circuit providing the direct voltage between the first and the second conductive lines to the first input of the power circuit;
   the power circuit comprises the inverter circuit and the intermediate circuit connected between the first and the second conductive lines to be interposed between the power supply circuit and the inverter circuit;
   the inverter circuit comprises:

the first, the second and the third power transistors connected between the first conductive line and a first, a second and a third output terminals, respectively, of the inverter circuit, a fourth, a fifth and a sixth power transistors connected between the second conductive line and the first, second and third output terminals, respectively;

the electronic control circuit configured to generate the pulse width modulation signals to control the switching on/off of the first, second, third, fourth, fifth and sixth power transistors of the inverter to convert the direct voltage in the first, in the second and in the third three-phase voltages, applied, respectively, between the first, second and third output terminals of the inverter circuit and a reference terminal, and to deliver a first, a second and a third three-phase currents to be provided to the inductive load;

the frequency converter being configured to implement the method of claim 1.

6. The frequency converter according to claim 5, wherein the electronic control circuit comprises a microcontroller or a DSP, the method being implemented by a firmware code incorporated in said the microcontroller or DSP.

7. The frequency converter according to claim 5, wherein the electronic control circuit further comprises a PWM modulator unit achieved by means of a FPGA or PLD programmable logic, the method being implemented on said FPGA or PLD programmable logic.

8. The frequency converter according to claim 5, wherein the electronic control circuit further comprises a driving unit of the first, second, third, fourth, fifth and sixth power transistors of the inverter circuit, the driving unit including electric decouplers to galvanically isolate the electronic control circuit from the power circuit.

9. The frequency converter according to claim 5, further comprising an electronic measurement acquisition unit configured as an interface for the conditioning and the analog-digital conversion of measurement signals provided by current and voltage sensors which equip the converter towards the electronic control circuit.

10. The frequency converter according to claim 9, wherein the current sensors are Hall sensors associated with the inverter circuit to detect instantaneous values of the first, the second and the third three-phase currents, present, respectively, on the first, the second and the third output terminals of the inverter circuit.

11. The frequency converter according to claim 9, wherein the voltage sensor is associated with the intermediate circuit to detect instantaneous values of a voltage present between the first and the second conductive lines.

12. A method for controlling the frequency converter adapted to supply electric power in alternating current, AC, to an inductive load, the frequency converter comprises:

a power supply circuit having an input connected to a voltage source and an output connected to a power circuit by means of a first and a second conductive lines, the power supply circuit providing a direct voltage between the first and the second conductive lines to a first input of the power circuit;

the power circuit comprises an inverter circuit and an intermediate circuit connected between the first and the second conductive lines to be interposed between the power supply circuit and the inverter circuit;

the inverter circuit comprises:

a first, a second and a third power transistors connected between the first conductive line and a first, a second and a third output terminals, respectively, of the inverter circuit, a fourth, a fifth and a sixth power transistors connected between the second conductive line and the first, second and third output terminals, respectively, the control method comprising the steps of:

generating, by an electronic control circuit of the frequency converter, pulse width modulation signals to control the switching on/off of the first, second, third, fourth, fifth and sixth power transistors of the inverter to convert the direct voltage in a first, in a second and in a third three-phase voltages, applied, respectively, between the first, second and third output terminals of the inverter circuit and a reference electric potential, and to deliver a first, a second and a third three-phase currents to be provided to the inductive load;

detecting, at an instant of time of interruption, an interruption in the generation of the pulse width modulation signals on the basis of which the first, second, third, fourth, fifth and sixth power transistors are simultaneously off;

detecting, by the electronic control circuit, an instantaneous value of the first, second and third three-phase currents at the instant of time of interruption;

detecting, in the instant of time of interruption, by the electronic control circuit, operating status signals, respectively:

of the first and of the fourth power transistors, of the second and of the fifth power transistors, of the third and of the sixth power transistors;

in the case where at least one of the first and fourth power transistors is in a fault condition, the method provides the steps of:

keeping off, by the electronic control circuit, the first and fourth power transistors;

controlling, by the electronic control circuit, the simultaneous switching on of the fifth and of the sixth electronic power transistors, if the instantaneous value of the first phase current is greater than zero, controlling the simultaneous switching on of the second and of the third electronic power transistor, if the instantaneous value of the first phase current is less than zero;

or in the case where at least one of the second and fifth power transistors is in a fault condition, the method provides the steps of:

keeping off, by the electronic control circuit, the second and fifth power transistors;

controlling, by the electronic control circuit, the simultaneous switching on of the fourth and of the sixth electronic power transistors, if the instantaneous value of the second phase current is greater than zero, controlling, by the electronic control circuit, the simultaneous switching on of the first and of the third electronic power transistors, if the instantaneous value of the second phase current is less than zero;

or in the case where at least one of the third and sixth power transistors is in a fault condition, the method provides the steps of:

keeping off, by the electronic control circuit, the third and sixth power transistors in the fault condition;

controlling, by the electronic control circuit, the simultaneous switching on of the fourth and of the fifth electronic power transistors, if the instantaneous value of the third phase current is greater than zero, controlling, by the electronic control circuit, the simultaneous switching on of the first and of the second electronic power transistors, if the instantaneous value of the third phase current is less than zero;

the control method inhibiting a slip of the first, second and third three-phase currents towards the intermediate circuit.

13. The method for controlling the frequency converter according to claim 12, wherein the step of controlling occurs at a first instant of time and comprises the further steps of:

keeping on, during a time interval delimited by the first instant of time and by a subsequent second instant of time:

the fifth and the sixth electronic power transistors, if the instantaneous value of the first phase current is greater than zero, the second and the third electronic power transistors, if the instantaneous value of the first phase current is less than zero;

or the fourth and the sixth electronic power transistors, if the instantaneous value of the second phase current is greater than zero, the first and the third electronic power transistors, if the instantaneous value of the second phase current is less than zero;

or the fourth and the fifth electronic power transistors, if the instantaneous value of the third phase current is greater than zero, the first and the second electronic power transistor, if the instantaneous value of the third phase currents is less than zero;

in the second instant of time, simultaneously switching off the fifth and the sixth electronic power transistors, or the second and the third electronic power transistors;

or the fourth and the sixth electronic power transistors, or the first and the third electronic power transistors;

or the fourth and the fifth electronic power transistors, or the first and the second electronic power transistors.

14. The method for controlling the frequency converter according to claim 13, wherein a duration of the time interval is programmable.

15. The method for controlling the frequency converter according to claim 13, wherein a duration of the time interval is greater than or equal to $3.5*(L/R)$, L is an inductance associated with the inductive load and R is a resistance associated with such load.

16. The method for controlling the frequency converter according to claim 12, wherein the step of controlling comprises a step of generating, by the electronic control circuit:

first control signals to simultaneously switch on the fifth and the sixth electronic power transistors, if the instantaneous value of the first phase current is greater than zero, second control signals to simultaneously switch on the second and the third electronic power transistors, if the instantaneous value of the first phase current is less than zero;

or third control signals to simultaneously switch on the fourth and the sixth electronic power transistors, if the instantaneous value of the second phase current is greater than zero, fourth control signals to simultaneously switch on the first and the third electronic power transistors, if the instantaneous value of the second phase current is less than zero;

or fifth control signals to simultaneously switch on the fourth and the fifth electronic power transistors, if the instantaneous value of the third phase current is greater than zero, sixth control signals to simultaneously switch on the first and the second electronic power transistors, if the instantaneous value of the third phase current is less than zero.

* * * * *